United States Patent

[11] 3,551,698

[72] Inventor Lawrence R. Smith
Phoenix, Ariz.
[21] Appl. No. 702,440
[22] Filed Feb. 1, 1968
[45] Patented Dec. 29, 1970
[73] Assignee Motorola, Inc.
Franklin Park, Ill.
a corporation of Illinois

[54] ANALOG MEMORY SYSTEM
21 Claims, 3 Drawing Figs.

[52] U.S. Cl. .......... 307/238, 307/251, 340/173
[51] Int. Cl. .......... G11c 5/06
[50] Field of Search .......... 307/238, 251, 304, 303; 328/121; 340/173

[56] References Cited

IBM Technical Disclosure Bulletin, Vol. 9 No. 7, Dec. 1966, titled ANALOG STORAGE CIRCUIT, written by J. W. Beck, pp. 916 & 917. A copy is located in class 307 subclass 238 in Group 250.

*Primary Examiner*—Stanley T. Krawczewicz
*Attorney*—Mueller and Aichele

ABSTRACT: Two MOSFETs form a gated analog input circuit for selectively connecting an analog source to a capacitive memory element. The capacitive memory element is also connected through a MOSFET to a differential-amplifier type noninverting unity-gain follower circuit. The output signal of the follower circuit is supplied to a metallic layer forming a potential plane in juxtaposition to the capacitive memory element. A supporting insulated binding post for the capacitive memory element is mounted on the potential plane for reducing leakage losses from the memory element. The output signal is also supplied through a suitable resistor to the gated analog input circuit intermediate the two MOSFETs. This connection substantially reduces leakage through the input circuit. In this manner an extremely high impedance is provided for the memory element whenever its voltage is not being changed, such that even when power is removed voltage on the capacitive memory element is not altered over extended periods of time.

PATENTED DEC 29 1970 3,551,698

INVENTOR
Lawrence R. Smith
BY
Mueller, Aichele, & Rauner
Atty's

ANALOG MEMORY SYSTEM

BACKGROUND OF THE INVENTION

This invention relates to memory systems, particularly to those systems utilizing a capacitive memory element.

A memory capability, whether analogue or digital, has been found highly desirable in many, many applications and situations. The terms analogue and digital respectively refer to signals in which the magnitude indicates value and wherein the presence or absence of a plurality of signals indicates a value. Memory capability may be transient or permanent, it may be selectively alterable or unalterable, and supply a continuous or repetitive indication of stored signals. In many applications, the most advantageous type of memory capability is that which is selectively, preferably electrically, alterable, yet exhibits a high degree of retentivity over extended periods of time, and supplies a continuous indication of the stored signals. This capability permits transmission of analogue control signals between a plurality of stations over a single line on a time shared or on addressed bases. The longer the period of faithful retention of signals, the more advantageous the memory capability in that a greater number of stations are permitted. Also, in electrical apparatus, if the memory capability can retain the stored signal or signals through a power catastrophe, its value in many applications is greatly enhanced. In the event of a malfunction somewhere in a supervisory control system, it is desirable that the operation or process continue to operate. In such instances, it is necessary that a memory capability be provided within each remote station having a control device capable of remembering signals suitable to control a process or operation in a predetermined manner. Because of such memory, such control may be independent of other portions of the supervisory control system.

Such memory capabilities have been provided by magnetic devices, capacitive devices, as well as other forms of electrical circuits, including relays, flip-flops, and the like. Because of many difficulties in faithfully storing analogue signals over extended periods of time, digital memories have in general been used wherein electrical signal retention for periods of time greater than a few hours is required. Magnetic and capacitive elements have a memory capability extendable through a power catastrophe.

Magnetic and capacitive elements have both been used for storing analogue signals. Magnetic devices store signals in the form of residual magnetization and, therefore, do not supply a continuous electrical indication of the stored signal; the electrical sensing of stored magnetic signals is by techniques that usually tend to alter the stored signal, requiring restoration. Such techniques can be quite complex and expensive.

An alternative is to use a capacitive element, Capacitive elements store analogue signals in the form of an electric charge. Such stored charge is continuously indicated by the voltage across the capacitive element. Such charge storage is subject to error in that each capacitive element has what is termed "leakage" which tends to diminish the stored charge with time and, therefore, diminish the voltage across the capacitor. While high-quality capacitors are available, connections to the capacitor itself provide sufficient leakage to diminish the stored charge over a relatively short period of time, i.e., less than one day. Therefore, capacitive memory elements, while usable for faithful storage of analogue signals over short periods of time, have not been used as storage elements for storing analogue signals without alteration over extended periods of time.

In supervisory control systems, it is desirable to provide a continuous analogue signal to the controlling element. When so doing from a capacitive memory element, there is a tendency for the continuous sensing operation to alter the electric charge stored therein. For this reason, other forms of analogue memory elements, such as servopositioning motors, slide wires, and the like, have been utilized in the past for use in process control systems. If a capacitive element could be used for such long term memory capability, cost and size would be reduced and operating efficiencies could be increased.

SUMMARY OF THE INVENTION

It is an object of this invention to provide an improved capacitive-type analogue memory system supplying a continuous output signal indicative of a stored charge magnitude.

It is another object of this invention to provide an analogue memory system having extremely low leakage.

It is the further object of this invention to provide an analogue memory system of the capacitive type which retains its stored signal through a power failure.

A feature of the present invention is the combination of a low-leakage capacitive memory element supplying a voltage indicating its stored charge to a field electrode of a semiconductor device in a noninverting unity-gain follower circuit. The output signal of the follower circuit is supplied to suitable loads and is fed back to the capacitive element to electrically reduce leakage of the stored charge.

Another feature is to feed back the output signal of the follower circuit to a gated analogue input circuit such that leakage through the input circuit is electrically reduced.

It is another feature of the invention to provide an analogue memory system having an input circuit and an output circuit with extremely high impedances such that in the event of power catastrophe or failure the capacitive memory element substantially retains its stored electric charge.

Apparatus utilizing the present invention has a capacitive element in a circuit and physically disposed such that leakage is minimized. One end of the capacitive element or capacitor may be connected to a reference potential, such as ground. The other end terminal is connected to a high-quality insulated binding post. The binding post is on a metallic layer maintained at a potential equal or approximately equal to the potential on the one end of the capacitor. This equalizing potential reduces the electric field across the insulated post and thereby decreases the leakage from the capacitor therethrough. A noninverting unity-gain follower circuit is connected to the capacitor element one end for receiving the voltage therefrom. An extremely high-input impedance to the follower circuits is provided by a field electrode semiconductor device, such as a MOSFET. The field electrode is connected to the binding post for receiving the voltage. The follower circuit output signal is substantially equal to the voltage magnitude stored in the capacitive element and is fed back to the potential plane.

The input circuit for selectively altering the voltage stored across the capacitive element includes a pair of field electrode semiconductor devices, such as MOSFETs. Such devices are connected as gates. A resistance is connected to the input circuit for supplying the output signal back to the input circuit for reducing leakage through the input circuit by providing a very low potential across the MOSFET connected to the binding post.

In the event of power failure, the field electrode semiconductor devices present a very high impedance for maintaining the voltage stored in the capacitive element. However, in the event of power failure or system failure, it may be desirable to alter the voltage stored across the capacitive memory element to a predetermined value. To accomplish this, ohmic links are provided for connecting the binding post terminal through a suitable resistance to a reference potential such that when there is a system failure the stored charge, and thus the voltage, will be altered to a predetermined value. This predetermined value of voltage is then supplied to a load for adjusting the process or operation being controlled to a predetermined fail safe state.

THE DRAWINGS

DESCRIPTION OF THE ILLUSTRATIVE EMBODIMENT

Figure 1:
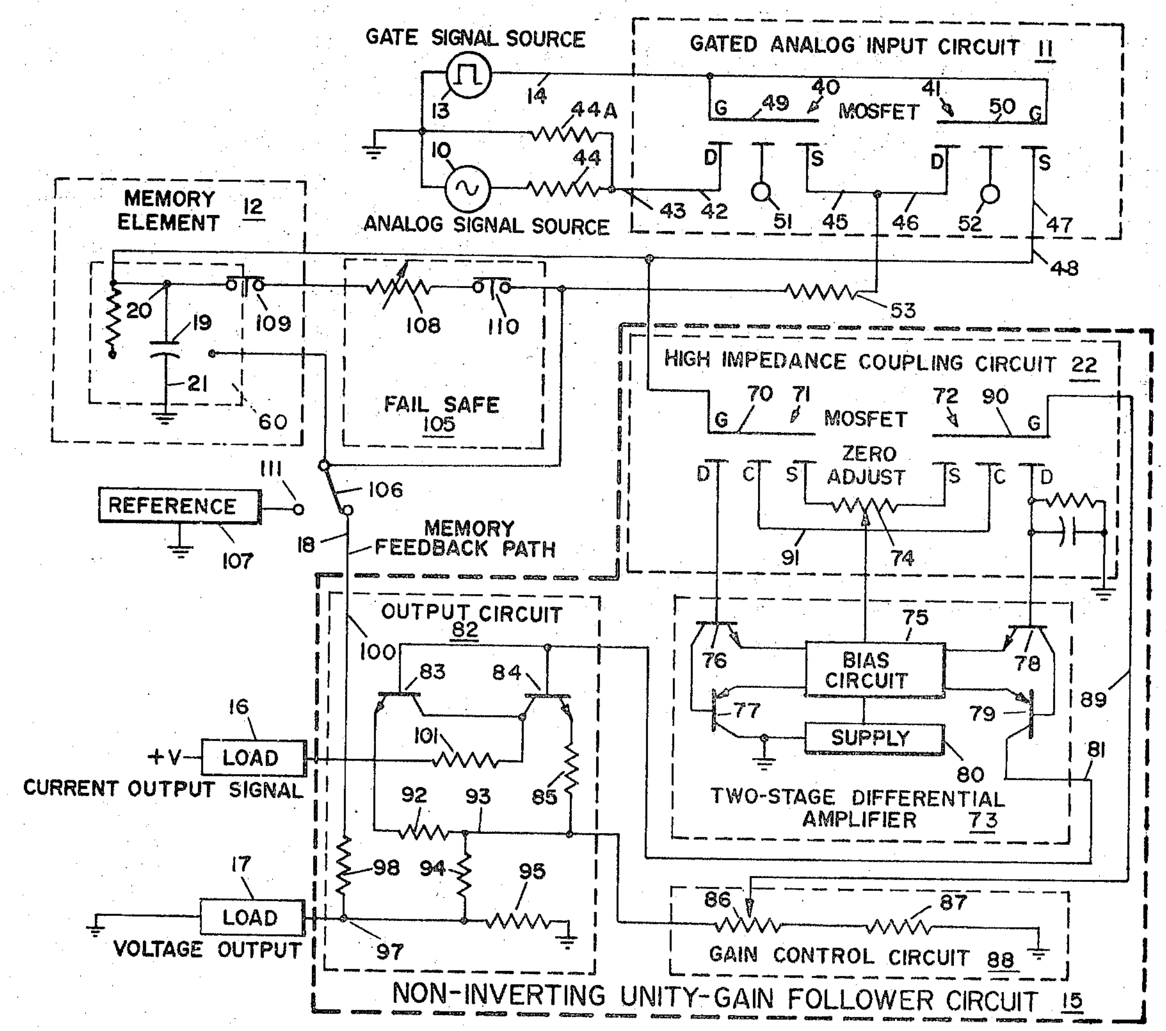
FIG. 1 is a schematic diagram of a system embodying the present invention.

Referring more particularly to the drawing, like numbers indicate like parts and structural features in the diagram and in the other views. Referring first to FIG. 1, an analogue signal from source 10 is supplied through gated analogue input circuit 11 to be stored in memory element 12. Gate signal source 13 supplies a signal over line 14 to electrically connect or disconnect source 10 from memory element 12. The magnitude of the voltage-type analogue signal stored in memory element 12 is continuously supplied through noninverting unity-gain follower circuit 15 to either or both loads 16 and 17. Load 16 is a current responsive device having a low electrical impedance, while load 17 is a voltage responsive device having a relatively high-electrical impedance. The output signal supplied by follower circuit 15 is also supplied over memory feedback path 18 to input circuit 11 and to memory element 12, as will be fully described. Since circuit 15 is a unity-gain amplifier, the feedback signal on path 18 is equal in voltage magnitude to the input signal voltage magnitude and therefore to the voltage magnitude stored in memory element 12 and is operative to substantially reduce the leakage of stored charge from capacitor 19 in memory element 12.

Reduction of leakage of the stored charge in capacitor 19 is provided in part by the extremely high-impedance circuits coupled to the high-voltage terminal 20 of capacitor 19. The other capacitor 19 terminal 21 is connected to a reference potential, such as ground reference potential. In maintaining storage of a charge in a capacitor, even with extremely high impedance circuits, high-humidity conditions may provide leakage paths from the capacitor and its environs to sources of reference potential. To this end, the memory feedback path 18 returns a portion of the output signal to apparatus in juxtaposition to capacitor 19 for greatly reducing potential differences between various points of the circuit, especially adjacent terminal 20, for further reducing leakage through such coupled high impedance elements. The low leakage providing relationship is later described in the arrangement and operation of the gated analogue input circuit 11 and the high-impedance coupling circuit 22 forming a part of the unity-gain follower circuit 15.

Figure 2:
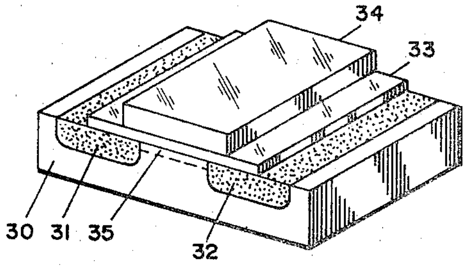
FIG. 2 is a diagrammatic showing of a field electrode-type semiconductor device.

In providing high-impedance circuits, it is quite important to properly select the electronic or electrical components forming the circuit. Semiconductor devices having field electrodes exhibit extremely high impedances and low leakage. For analogue signal storage, these devices must be properly interconnected and operated to provide electrical circuits having the desired low leakage. To better understand the invention, a typical field electrode semiconductor device is illustrated in diagrammatic form in FIG. 2 and its operation will be briefly explained before proceeding further with the system description. FIG. 2 shows a MOSFET (Metal Oxide Semiconductor Field-Effect Transistor) having a P-type substrate 30. It is understood that an N-type substrate may also be utilized. Substrate 30 is of high-resistivity P-type material with two separate low-resistivity N-type regions 31 and 32, respectively, serving as the source and drain electrodes of the device. These electrodes provide a current path through the device. An insulating oxide layer 33 covers the junctions between regions 31, 32 and substrate 30, as shown. A metallic layer 34 forms the gate electrode for selectively inducing a conductive channel between regions 31 and 32, as indicated by dotted line 35. Note there is no physical penetration of metal layer or gate electrode 34 through oxide layer 33 into substrate 30, the electrical effect being caused solely by the electric field of metal layer 34. Since the drain and source regions 31, 32 are isolated by the substrate through the rectifying junctions, any source-to-drain current in the absence of gate voltage on metal layer 34 is extremely low because the structure is analogous to two diodes connected back-to-back. The metal area of the gate electrode 34 in conjunction with the insulating oxide layer 33 and the semiconductor channel indicated by dotted line 35 form a capacitor. The gate electrode 34 is the top plate, and the substrate material in channel 35 is the bottom plate. The application of a positive potential to field electrode 34 induces a negative charge in the semiconductor channel region 35 which increases as the applied gate voltage is increased until the region immediately below oxide layer 33 intermediate regions 31 and 32 becomes an N-type semiconductor region readily permitting current to flow between the source and the drain. The channel resistance is directly related to the gate voltage. By applying a large positive gate voltage, a low-impedance path is provided between the source and drain electrodes; whereas, if a negative signal is applied to gate layer 34, a very high impedance is provided.

The input resistance to field electrode 34 is extremely high because the field electrode 34 behaves as a capacitor with very low leakage. For example, the input impedance may be 100 million megohms. The output impedance is a function of the gate voltage and is equal to the impedance across the channel region plus the drain and source bulk resistances in regions 31 and 32. The FET illustrated in FIG. 2 is often termed an enhancement type of MOSFET or IGFET (Insulated Gate Field-Effect Transistor). Depletion types of IGFETs or MOSFETs utilize an N-type region 35 between P-type source and drain regions. There are provided combination devices utilizing both effects. Therefore, the field electrode semiconductor device, such as shown in FIG. 2, is useful for making connections to memory element 12 because of its extremely high-input impedance to gate electrode 34 and high impedance between source and drain electrodes when made nonconductive.

Capacitor 19 has several leakage paths for carrying small electrical currents which alter the magnitude of the stored voltage. In normal circuit design parlance, these leakage paths have extremely high impedances, yet sufficient electrical current can flow to have deleterious effect on the stored charge magnitude. A first leakage path is through gated analogue input circuit 11, a second path is through the high-impedance coupling circuit 22 which is necessary to sense the stored voltage for supplying a useful output current, and a third leakage path is through the environment in which capacitor 19 is located as diagrammatically illustrated in FIG. 3. Feedback connections between follower circuit 15 output portion 82 and the memory element 12 and input circuit 11 provide a very low-voltage potential, i.e., approaching 0 voltage difference, between the capacitor one terminal 20 and portions of the circuit in juxtaposition thereto. The high-impedance coupling circuit 22 is connected such that the maximum input impedance is presented to terminal 20 for limiting to an extremely low value any charge that is drawn from or supplied to capacitor 19.

Prevention of leakage through input circuit 11 is provided by a combination of high impedance and a small potential thereacross.

Input circuit 11 consists of two serially connected MOSFETs 40 and 41. Drain electrode 42 is connected over line 43 to signal source 10 which has an internal impedance represented by resistor 44. Resistor 44A is a tie-down resistor. Source electrode 45 is connected to the drain electrode 46 of MOSFET 41. Source electrode 47 is connected over line 48 to terminal 20 of capacitor 19. Gate electrodes 49 and 50 are connected together and to signal source 13 over line 14. When source 13 supplies a relatively positive signal, both MOSFETs 40 and 41 are simultaneously switched to a low-impedance state for selectively connecting source 10 to terminal 20 for altering the electric charge in capacitor 19. When source 13 supplies a relatively negative potential over line 14, MOSFETs 40 and 41 are switched to a nonconductive or high-impedance state.

During the high-impedance state of input circuit 11, it is desired to minimize leakage between terminal 20 and line 43, line 14 and any reference potential. To decrease leakage from terminal 20 to a reference potential. To decrease leakage from terminal 20 to a reference potential, the substrates of MOSFETs 40 and 41 (such as substrate 30 of FIG. 2) are made electrically floating as indicated by unconnected terminals 51 and 52. Referring again to FIG. 2, it is seen that the source and drain regions 31 and 32 have electrical connections to substrate 30 through the rectifying junction. If the substrate 30 were connected to reference potential, this connection would provide an additional leakage path for any voltage imposed on either of the regions. The other possible leakage paths of the MOSFETs in circuit 11 are between the source electrode 47 and the drain electrode 42. In this path current could flow toward capacitor 19 increasing its electric charge, or from capacitor 19 to decrease its electric charge. To minimize this leakage, resistor 53 has one end connected to the junction between MOSFETs 40 and 41, i.e., to source electrode 45 and drain electrode 46. The other end of resistor 53 is connected to memory feedback path 18 for receiving the output signal. It is remembered that noninverting unity-gain follower circuit 15 supplies a signal substantially equal to the magnitude of the voltage across capacitor 19. This connection then provides a voltage magnitude on drain electrode 46 that is substantially equal to the voltage magnitude on terminal 20 of capacitor 19. Since there is a substantially zero voltage between the MOSFET 41 source and drain electrodes, there is insubstantial leakage between terminal 20 and drain electrode 46. Therefore, the described connection of resistor 53 substantially eliminates leakage in input circuit 11 between source 10 and terminal 20.

The resistive magnitude of resistor 53 may be 100,000 ohms, for example. This impedance value is sufficiently large to provide a high impedance for developing a signal thereacross, such that when MOSFETs 40 and 41 are in the conductive state, a signal may be transferred between source 10 to impose a predetermined voltage across capacitor 19. Yet it is substantially smaller than the electrical impedance between the source and drain electrodes of MOSFET 41 when in the nonconductive state. It is also small compared with the impedance of MOSFET 40, so, in effect, effectively disconnects source 10 from terminal 20.

The leakage impedance provided in circuit 11 can be calculated by formula R1 × R1/R2 wherein R1 is the nonconductive impedance of each of the MOSFETs 40 and 41 between the source and drain electrodes and R2 is the electrical impedance of resistor 53. Since R2 is much smaller than R1 by several magnitudes, an extremely high-leakage impedance is provided between source 10 and terminal 20. Typically, R1 is about 1,000 megohms. With R2 at 0.1 megohm (100,000 ohms), the impedance of circuit 11 between line 43 and line 48 is 1000 × 1000/0.1 = 10,000,000,000,000 ohms, or 10 million megohms.

A third source of leakage in input circuit 11 is between source electrode 47 of MOSFET 41 and gate electrode 50 to gate signal source 13. It will be remembered that in a MOSFET this impedance may be equal to 100 million megohms and therefore provides an insubstantial leakage path for any voltage on terminal 20.

Figure 3:
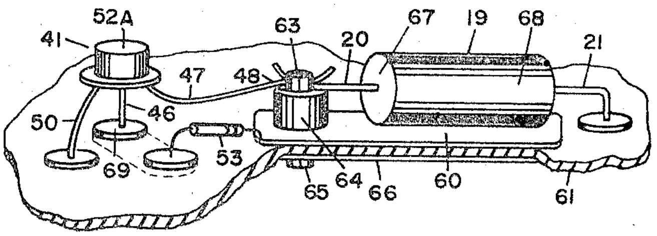
FIG. 3 is a diagrammatic partial illustration of a preferred manner of mounting a capacitive memory element on a binding post and showing the potential plane in proximate relation to the memory element.

The substantial elimination of leakage of the stored charge in capacitor 19 to its immediate environs is now explained with respect to FIGS. 1 and 3. A "potential-guarding" plane is provided—in the form of a metallic layer 60—on insulating board 61 immediately below capacitor 19. Capacitor 19 is shown as a polystyrene tubular-type capacitor. Metallic layer 60 is connected over line 62 to memory feedback path 18. Therefore, the potential guarding plane of layer 60 is kept at the voltage magnitude equal to the output signal which, with unity-gain follower circuit 15, is substantially identical to the voltage magnitude stored across capacitor 19. In a practical circuit there may be a slight potential difference between the stored voltage magnitude and the output signal magnitude, for example, somewhat less than a millivolt. This reduction in potential differences in the capacitor 19 environs reduces leakage to practically zero.

Since dry air is a very good insulating medium, capacitor 19 is mounted in free space immediately above guarding-potential layer 60. The stored voltage terminal 20 is connected to conductive terminal bolt 63 which is suitably mounted on high-quality insulating post 64. Post 64 is mounted on metallic layer 60, as by bolt 65 extending through insulating layer 61. As seen in FIG. 3, bolt 65 is an ohmic connection with a second metallic layer 66 on the reverse side of insulating layer 61. Bolt 65 extends into insulating post 64 for a short distance, but is spaced from terminal binding bolt 63. The leakage impedance provided by insulating post 64 has a minimal effect on the charge stored in capacitor 19 because of guarding potential layer 60 being kept at substantially the same voltage as terminal 20. Also, any leakage through the air from capacitor 19 is minimal because it is located in proximate location to guarding potential layer 60 which has an identical voltage thereon. As the device is kept in an operating atmosphere, dirt, high humidity conditions, etc. may cause contamination of the surface of tubular capacitor 19. Therefore, leakage may occur from terminal 20 over the end surface 67 of capacitor 19 and thence over the cylindrical surface 68 toward grounded terminal 21. Under such circumstances, capacitor 19 may be pushed against metallic layer 60 for reducing the electrical voltage difference between terminal 20 and any leakage source. Also, capacitor 19 may be inadvertently pushed downwardly toward insulating board 61. If metallic layer 60 is omitted, then surface 68 would contact the insulating board 61 which, in turn, may provide an additional leakage path and therefore adversely affect the storage of signals within capacitor 19. By making metallic layer 60 of a greater extend than capacitor 19, the chances of an inadvertent leakage path adversely affecting the storage of an electric charge in capacitor 19 is substantially reduced. Lead 48 between terminal bolt 63 and MOSFET 41 is kept in free space away from any insulating boards. The substrate of MOSFET 41 is electrically connected to the canister 52A. Leads 46 and 50, respectively, of the drain and gate electrodes are kept long such that the case 52A is spaced from insulating board 61 to ensure no leakage loss thereto. Drain electrode 46 is connected through printed wiring 69 to resistor 53 which is, in turn, connected to metallic layer 60, as shown. The close proximity of resistor 53 to insulating board 61 has caused no noticeable adverse affect with respect to increasing leakage of storage element 19. The potential difference between the terminal 20 of capacitor 19 and its immediate environs is therefore kept at a substantially low potential approaching zero potential difference for greatly decreasing any leakage from terminal 20 through any insulating material supporting capacitor 19.

The third possible leakage path is through the input portion of follower circuit 15 which is through a gate electrode 70 of MOSFET 71 in high-impedance coupling circuit 22. High-impedance coupling circuit 22, consisting of third MOSFET 71 and fourth MOSFET 72, provides a balanced high-impedance input circuit to two-stage differential amplifier 73. The input impedance to MOSFET 71 through its gate electrode 70 is measured at about 100 million megohms, for example. As such, any leakage through the gate electrode is the same as leakage through a very small capacitor. It should be remembered that capacitor 19 is continuously connected to gate electrode 70 such that follower circuit 15 may continuously supply an output signal having a magnitude directly related to the stored voltage.

High-impedance coupler circuit 22 forms a differential input to two-stage differential amplifier 73. The source electrodes of MOSFET 71 and 72 are interconnected together through potentiometer 74 which has its center tap connected to bias circuit 75 for providing the zero input adjustment of follower circuit 15 to unity gain. Bias circuit 75 may be any known bias circuit usable with known two-stage differential amplifiers of the type illustrated with NPN transistors 76, 77, 78, and 79. A power supply 80 of known design is used to supply power through bias circuit 75 which may consist of voltage divider, etc. to operate the amplifier 73. Supply 80 may be a portion of a circuit (not shown) which supplies power for the entire FIG. 1 illustrated apparatus. Two-stage differential amplifier 73 supplies a signal indicative of the stored charge in capacitor 19 over line 81 to output circuit 82. Circuit 82 consists of parallel-connected emitter-follower transistors 83 and 84. If desired, transistors 83 and 84 may be replaced by a single transistor. The emitter of transistor 84 is connected through voltage divider resistors 85, 86, and 87 to ground reference potential. Resistors 86 and 87 form gain control circuit 88 which is connected over line 89 to the gate electrode 90 of MOSFET 72. Resistor 86 is shown as a potentiometer such that follower circuit 15 may be adjusted to unity gain at maximum input voltage magnitude. As the signal on gate electrode 70 is altered, two-stage amplifier circuit 73 supplies a changing signal over line 81 which is then reflected through gain control circuit 88 and thence over line 89 to gate electrode 90 of MOSFET 72. This, in turn, adjusts the differential amplifier 73 such that the signal on line 81 equals the magnitude of the input signal on gate 70. By examination of the circuit connections shown in differential amplifier 73 and high-impedance circuit 22, it can be seen that the polarity of the signal on line 81 will follow that of the signal on gate electrode 70. Therefore, it is noninverting. By adjustment of potentiometers 74 and 86, unity gain can be made and be established at zero input signal magnitude and at maximum input signal magnitude and, therefore, unity gain is substantially provided throughout the range of voltage magnitudes stored in capacitor 19.

As stated before with respect to input circuit 11, the leakage of a MOSFET can be substantially reduced by keeping the substrate electrically floating with respect to the remainder of the circuit. In this respect, MOSFETs 71 and 72 have their substrates electrically connected together over line 91 but electrically disconnected from the remainder of the circuit. The substrates are also electrically and thermally connected to the cases of the MOSFETS, such as case 52A of MOSFET 41. It is also desirable to make a good thermal connection between the cases holding MOSFETS 71 and 72 such that the internal operating temperatures of the two MOSFETs are kept identical. This arrangement ensures that as ambient temperature varies, the operation of the two MOSFETs in coupling circuit 22 remain identical to provide a unity gain in circuit 15 throughout a wide range of ambient temperatures. Line 91 schematically indicates this good thermal connection.

Referring again to output circuit 82, emitter-follower resistors 85 and 92 are the emitter-follower resistors of parallel connected transistors 84 and 83, respectively. These resistors are connected to common output connection line 93. It is important that transistors 83 and 84 be kept at the same temperature such that the current division ratio will be substantially constant over the operating range. By making resistors 92 and 85 equal in impedance, for example, the current division between the two transistors should be substantially equal such that one transistor does not over conduct. The output circuit is completed by a voltage divider consisting of resistors 94 and 95 for supplying an output voltage over line 96 to terminal 97 to high-impedance load 17 which has one end grounded. Load 17 may be a voltage-responsive device for controlling a process, for example. Resistor 98 connects line 96 to memory feedback path 18.

On certain occasions it may be desirable to have a current responsive load 16. One end of load 16 is connected to positive voltage source +V. The other end of load 16 is connected through current limiting resistor 101 to the commonly connected collectors of transistors 83 and 84. Therefore, the output transistor collector supply is through current load 16 with the current magnitude being determined by the base voltage 81 and the parallel emitter resistance of transistors 83 and 84. Such current is indicative of the voltage magnitude (stored electric charge) across capacitor 19.

If power supply 80, as well as other power supplies not shown in the FIG. fails, the high impedances above referred to prevent capacitor 19 from discharging or otherwise altering its stored electric charge. Upon reconnection of the circuit to the power supply or upon the reestablishment of power, the high impedances prevent any substantial alteration of the stored electric charge. Reestablishment of power should be sequenced such that no positive signal is supplied over line 14 before an appropriate analogue signal magnitude is supplied to line 43. Upon a power failure, the leakage paths from capacitor 19 to its immediate environs are increased because metallic layer 60 (FIG. 3) is no longer at the same terminal 20 voltage magnitude. However, the retentivity of the voltage magnitude across capacitor 19 remains quite good.

In the event of a system failure outside the illustrated apparatus, it may be desirable to alter the charge on capacitor 19 to a value such that the output signal supplied over line 96 or 100 will reach a predetermined value for operating a process (not shown) at a safe value. To this end, fail safe circuit 105 is provided with switch 106 making a connection to reference source 107 for receiving the predetermined voltage magnitude. Fail safe circuit 105 consists of variable resistance 108 connected by low-impedance link 109 to terminal 20. During normal operation of the system, link 109 is kept open. Upon detection of a failure (not shown), link 109 is then completed, either manually or automatically. The other end of fail safe circuit 105 consists of link 110 connecting terminal 20 through impedance 108 to line 62. By adjusting the size of impedance 108, the time of discharge or charge of capacitor 19 is controlled. This time constant may be important wherein a process is being controlled to ensure that a too rapid change is not imposed upon the process. Line 62 is then connected through switch 106 to terminal 111 which then is kept at a reference potential determined by source 107, which may be a battery or other type of set point device. Therefore, it is seen that terminal 20 will slowly change to the potential supplied by reference source 107. Upon reestablishment of system operations, links 109 and 110 are removed while capacitor 19 initially remains at the predetermined voltage. If this predetermined voltage is recorded in the control system, it can be operated such that analogue signal source 10 will supply signals through input circuit 11 to change the voltage amplitude across capacitor 19 at the predetermined change rate to reestablish optimum operation of a process being controlled.

I claim:

1. An analogue memory amplifier system having reference potentials, including in combination:

an insulated support member having one conductive end portion, a capacitive-type element having one end terminal connected to a reference potential and a second end terminal connected to the insulated support member conductive end portion;

a high-impedance input signal circuit having an input terminal and having an output terminal connected to said conductive end portion and exhibiting high-electrical impedance when not electrically conductive;

an output signal amplifier having high-input impedance with an input terminal connected to said insulated binding post and having a voltage gain of approximately unity and supplying an output signal;

a resistor connected to said high-impedance input signal circuit electrically intermediate said input circuit input and output terminals and connected to said output amplifier for receiving said output signal;

said input signal circuit having an on-off control such that signals are selectively passed to said conductive end portion;

potential plane means connected to said insulated support member and extending under said capacitive-type element and receiving said output signal for electrically guarding the capacitive-type element against leakage.

2. The subject matter of claim 1 wherein said potential plane means comprises:

a thin metallic layer;

an insulating support board under said metallic layer and supporting all components of said system;

a second metallic layer on the opposite side of said insulating layer and electrically connected to the first-mentioned metallic layer.

3. The subject matter of claim 2 further including a conductive bolt extending through the insulating board to support said insulated support member with the bolt terminating short of said conductive end portion.

4. The subject matter of claim 2 wherein said metallic layers extend the entire length of said capacitive-type element and being spaced therefrom.

5. The subject matter of claim 4 wherein said capacitive-type element is a low-leakage tubular capacitor extending parallel to said metallic layer and being suspended between said one and second end terminals.

6. The subject matter of claim 5 wherein said tubular capacitor is of polystyrene type.

7. The subject matter of claim 2 wherein said amplifier and input signal circuit include field-electrode type semiconductor devices for providing high-impedance characteristics.

8. The subject matter of claim 7 wherein said input signal circuit comprises two field electrode semiconductor devices each with a field electrode and said resistor connected intermediate said devices, with said on-off control including said field electrodes of said field electrode semiconductor devices.

9. The subject matter of claim 8 wherein said field electrodes are in ohmic connection.

10. The subject matter of claim 7 wherein said output amplifier comprises a noninverting unity-gain differential-type follower circuit with a pair of field electrode semiconductor devices providing a differential-type input connection with the connection to said insulating support member conductive end portion being to a field electrode of one of said output amplifier field electrode semiconductor devices.

11. The subject matter of claim 2 wherein said conductive end portion is connected through a variable impedance means to a reference potential.

12. The subject matter of claim 8 wherein said field electrode semiconductor devices are field-effect transistors with the field electrode being a gate electrode for said transistors.

13. The subject matter of claim 12 wherein:

said field-effect transistors have drain and source signal path electrodes and a gate electrode with one of said signal path electrodes of the first one of said field-effect transistors being an input connection to said input signal circuit;

a second one of said signal path electrodes of said first one field-effect transistor and a first one of said signal path electrodes of a second field-effect transistor in input signal circuit being connected together and to said resistor;

a second one of said signal path electrodes of said second transistor being connected to said conductive end portion.

14. The subject matter of claim 13 wherein said field-effect transistors have substrates electrically isolated from any portion of the system.

15. The subject matter of claim 13 wherein:

there are third and fourth field-effect transistors in said output amplifier, each having a gate electrode and drain and source signal path electrodes, with the gate electrode being a field electrode;

the gate electrode of said third transistor being connected to said conductive end portion, each of said third and fourth field-effect transistors having substrates electrically connected together but not electrically connected to any other portions of the circuit;

a zero adjusting potentiometer electrically connecting the one of said signal path electrodes of said third and fourth transistors together and having an adjustable tap connected to a reference potential which is operative to adjust the zero balance of the noninverting unity-gain differential-type follower circuit;

a two-stage differential amplifier circuit in said follower circuit having input connections to second ones of said signal path electrodes of said third and fourth field-effect transistors;

gain control circuit means receiving said output signal and connected to the gate electrode of said fourth field-effect transistor.

16. The subject matter of claim 15 wherein any leakage path from said conductive end portion through said high-impedance amplifier to the reference potentials has an electrical impedance of at least about 10 million megohms.

17. The subject matter of claim 15 wherein said substrates have a good thermal connection therebetween.

18. An analogue memory system including in combination:

a capacitive element having a voltage storing terminal having a voltage thereon indicative of any stored charge in the element;

gated high-impedance input means comprising first and second field-effect transistors each with a source and drain signal path electrode and an insulated gate electrode and a substrate with no electrical connections;

said gate electrodes being in ohmic connection;

a first one of said signal path electrodes of said first transistor being an analogue signal input connection;

a second one of said signal path electrodes of said first transistor being in ohmic connection with a first one of said signal path electrodes of said second transistor;

a second one of said signal path electrodes of said second transistor being in ohmic connection with said voltage storing terminal;

means responsive to a stored voltage to supply a like voltage magnitude signal; and a resistor coupling said like voltage magnitude signal to said first one of said signal path electrodes of said second transistor for electrically increasing leakage impedance across said second transistor.

19. An analogue memory circuit having a capacitor with a voltage storing terminal for storing an electric charge, the improvement including in combination;

gate means for receiving an analogue input signal to be stored in said capacitor and including first and second insulated-gate field-effect semiconductor devices each having a pair of signal-path electrodes and a gate electrode, one of said signal-path electrodes of said first device serving as an input terminal, one of said signal-path electrodes on said second device connected to said voltage storing terminal, other of said signal-path electrodes being connected together to complete a circuit between said input terminal and said voltage storing terminal through said signal-path electrodes;

gate control means connected to said gate electrodes for switching said devices between current conductive and nonconductive states between the respective signal-path electrodes for selectively passing an analogue input signal from the input terminal to said voltage-storing terminal;

output means including a third field-effect semiconductor device having an insulated-gate electrode and a pair of signal-path electrodes, said insulated-gate electrode connected to said voltage-storing terminal and said third field-effect semiconductor device being responsive to any signal stored in said capacitor to adjust said output means to supply a signal indicative of such stored signal.

20. The analogue memory circuit of claim 19 further including electrical means connected intermediate said first and second insulated-gate field-effect devices and operative when said second field-effect device is electrically nonconductive to establish a potential thereat having a predetermined relation to any voltage on said voltage-storing terminal.

21. An analogue memory circuit of claim 19 wherein:

said output means includes a unity gain amplifier having said third field-effect semiconductor device as input portion and an output portion supplying an output signal; and high high-resistive impedance means connected between said output portion and said gate means intermediate said other of said gate signal path electrodes for supplying said output signal thereto, the arrangement being such that when said first and second insulated gate field-effect semiconductor devices are current conductive, electrical impedance intermediate said input terminal and said voltage storing terminal, is substantially less that the electrical impedance of said high-resistive impedance means such that said output portion is substantially electrically disconnected from said gate means and when said first and second insulated gate field-effect semiconductor devices are nonconductive the electrical impedance of said devices first and second field-effect devices intermediate said input terminal and said voltage terminal, is substantially greater than that of said high-resistive impedance means such that the output signal is conducted to said gate means intermediate its input and output terminals.